United States Patent [19]

Vachtsevanos et al.

[11] Patent Number: 4,739,241
[45] Date of Patent: Apr. 19, 1988

[54] SPHERICAL MOTOR PARTICULARLY ADAPTED FOR ROBOTICS

[75] Inventors: George J. Vachtsevanos, Marietta; Kent R. Davey, Atlanta, both of Ga.

[73] Assignee: Georgia Tech Research Research Corporation, Atlanta, Ga.

[21] Appl. No.: 916,823

[22] Filed: Oct. 9, 1986

[51] Int. Cl.⁴ .............................................. H02P 5/34
[52] U.S. Cl. ................................... 318/800; 318/801; 318/802; 318/115; 318/568; 310/36; 310/166; 901/29; 901/28
[58] Field of Search ............... 318/800, 801, 802, 115, 318/568; 310/36, 166; 901/29

[56] References Cited

U.S. PATENT DOCUMENTS

| 3,052,859 | 9/1962 | Bers | 310/166 |
| 3,178,600 | 4/1965 | Bers | 310/166 |
| 4,139,790 | 2/1979 | Steen | 310/166 |
| 4,352,646 | 10/1982 | Laing et al. | 417/420 |

Primary Examiner—William M. Shoop, Jr.
Assistant Examiner—Brian Young
Attorney, Agent, or Firm—Hurt, Richardson, Garner, Todd & Cadenhead

[57] ABSTRACT

A spherical motor particularly adapted for robotic control. The motor comprises a stator housing defining a semispherical socket having an opening of generally polar cap form with a spherical rotor rotatably received in the socket for rotation therein about three axes intersecting at the center of the rotor with one of the axes projecting through the opening and the other two axes being orthogonal thereto. A motion transmitter is carried by the rotor and aligned generally along one axis to project through the opening, and windings are carried by the stator housing in encompassing and in opposed relation to the rotor for rotating the rotor about the axis. A polyphase control selectively controls relative phase and energization of the windings to rotate the spherical rotor a substantially unlimited amount about one axis and in limited amounts about the other axes so as to maintain the motion transmitting member within the confines of the opening.

26 Claims, 5 Drawing Sheets

SPHERICAL MOTOR PARTICULARLY ADAPTED FOR ROBOTICS

BACKGROUND AND BRIEF SUMMARY OF THE INVENTION

This invention relates to spherical motors and, in particular, to the utilization of such motors in robotics. Spherical motors are known in the prior art and, in particular, attention is called to the following U.S. patents:

Laing et al. U.S. Pat. No. 4,352,646, Oct. 5, 1982
Bers, U.S. Pat. No. 3,178,600, Apr. 13, 1965
Bers, U.S. Pat. No. 3,052,859, Sept. 4, 1962.

The two Bers patents are divisional applications of a common application Ser. No. 004,370 filed Jan. 25, 1960, and thus are identical in disclosure. Reference is therefore had to the earlier of these patents. The teaching is with respect to resolver type function generators and is thus not directly related to spherical motors. However, a stator with winding 10 is disclosed in surrounding relation to the hollow spherical member 16 also having a winding 12. Because the current density has a sinusoidal distribution along the inner surface of the outer member 14 or stator, angular rotation of the member 16 about its supporting shaft 36 (see FIG. 4) causes a sinusoidal variation in the flux produced by the winding 10 as coupled to the winding 12. Thus, angular rotation of a machine element imparted to the shaft 36 allows accurate resolution of this angular movement.

The Laing et al. patent is directed to a spherical motor for driving the impeller of a pump. The history and background of such motors, as discussed in this patent, is indicative that such motors normally impart rotation to the rotor thereof about a single axis (horizontal in the case of the patent.)

In addition to the above patents, applicants are aware of the following publications:

F. Williams, E. Laithwaite, and L. Piggot, BRUSHLESS VARIABLE-SPEED INDUCTION MOTORS, *Proc. IEE*, Vol. 104A, No. 2097U, pp 102–122, June 1956.

F. Williams, E. Laithwaite, and G. F. Eastham, DEVELOPMENT AND DESIGN OF SPHERICAL INDUCTION MOTORS, *Proc. IEE*, Vol. 106A, No. 3036U, pp 471–484, December 1959.

E. Laithwaite, DESIGN OF SPHERICAL MOTORS, *Electrical Times*, vol. 9, pp 921–925, June 1960.

A. Lebedev and P. Shinayev, MOMENTS ACTING IN A SPHERICAL MOTOR IN A MAGNETIC SUSPENSION, *Priborostroegie*, vol. 16, No. 5, pp 85–88, 1973.

A. Rozovskii and L. B. Svnolobova, ELECTROMAGNETIC PROCESSES IN AN ASYNCHRONOUS MOTOR WITH A SPHERICAL HOLLOW ROTOR, *Electromekh*, N.11, p 1231–1239, November 1976.

The above publications provide background information on spherical motors but are not believed to be germane to the subject matter disclosed and claimed herein.

BRIEF SUMMARY OF THE INVENTION

Insofar as we are aware, the prior art does not teach a robotic wrist joint assembly employing a spherical motor in which the rotor can be rotated in the stator in any direction by control of the winding means, nor does it teach the compound utilization of windings for determining the rotational positioning of the rotor with respect to the stator.

It is of concern in connection with this invention to provide an improved form of spherical motor in which the rotor is controlled as to rotation thereof with respect to the stator in any desired direction of rotation. In this respect, the stator is provided with polyphase windings means and means for controlling phase and/or excitation level of each winding so that the composite field wave produced by the winding means may be directed as desired to impart net rotational motion to the rotor in any desired direction.

This invention relates generally to spherical motors but in particular it relates to a spherical motor having utility in the field of robotics. Specifically, the motor of of this invention is useful in a wrist joint mechanism in which the rotor has three degrees of freedom so that roll, pitch and yaw may be attained. In this particular application of the invention, the stator winding provides the outer member of a wrist joint whereas the rotor forms the inner member and is socketed in the stator. The winding means is wound in such fashion that the relative phase and/or relative energization levels of the windings may be controlled to produce rotation of the rotor means in any direction so that motion about any one or a combination of the three axes of control is realized. In addition, means may be provided for detecting the relative position of the rotor with respect to the stator and which may also provide information regarding the movements of the rotor as well as the rates thereof.

The rotor means may be constructed so the spherical motor is of the induction drive type, of the synchronous drive type or of the reluctance drive type.

With the induction drive type, the rotor is in the form of a spherical conducting shell containing ferromagnetic material and the stator surrounds the rotor and is provided with two sets of windings. These two sets of windings are orthogonally related to each other, one set of windings being wound generally along longitudinal routes but in space relation to each other and the other set of windings being wound generally along lattitudinal routes so as to be orthogonal to the first set and also having spaces therebetween so that adjacent windings of the first set cross adjacent windings of the second set to define "cells" within the bounds of these adjacent windings which are used in this particular type of drive to determine the relative position of the rotor means with respect to the stator.

With the synchronous type drive, the rotor is of the form of a sphere having elongate permanent magnets oriented in the latitudinal direction in one hemisphere and in the longitudinal direction in the other hemisphere.

With the reluctance drive type, the rotor means is formed of magnetizable material of anisotropic shape. In this type of drive, the drive resembles that of a stepper motor, requiring control of the winding means which pulls one of the portions of the anisotropic shape into a definite position, thus to impart motion of the rotor means only about one of the individual axes at a time. Preferably, the rotor means for the reluctance type of drive is in the form of magnetizable steel of anisotropic shape to capitalize on magnetization forces. A preferred shape is that of a six-armed cross, two arms extending along each of the three axes, and the arms diverging outwardly from the origin and presenting spherical surfaces at their ends and which are of rectangular plan view.

It is another object of this invention to provide an improved form of spherical motor of the induction drive type in which the polyphase windings of the stator have individual turns thereof which are in crossing relation to provide a pattern or raster of areas or "cells" distributed over the surface of the stator which encloses the rotor, these areas being capable of excitation to produce peak values of flux density within such areas or cells. The excitations of the cells are controlled temporally so that at any given moment, the rotational position of the rotor with respect to the stator may be uniquely determined.

In accord with the preceding object, the excitation of the polyphase windings to impart the desired rotation of the rotor is effected at one frequency whereas the excitation of the areas or cells is effected at another frequency. Moreover, the excitation of the polyphase windings at the one frequency may be continuous so long as movement of the rotor means is desired whereas the excitation of the cells is sequential so as to scan through the entire raster field, repetitively.

Another object of this invention is to provide an improved form of spherical motor in which the polyphase windings thereof perform not only the function of imparting rotation to the rotor but also the function of enabling rotor position to be determined.

DETAILED DESCRIPTION OF THE INVENTION

Figure 1:
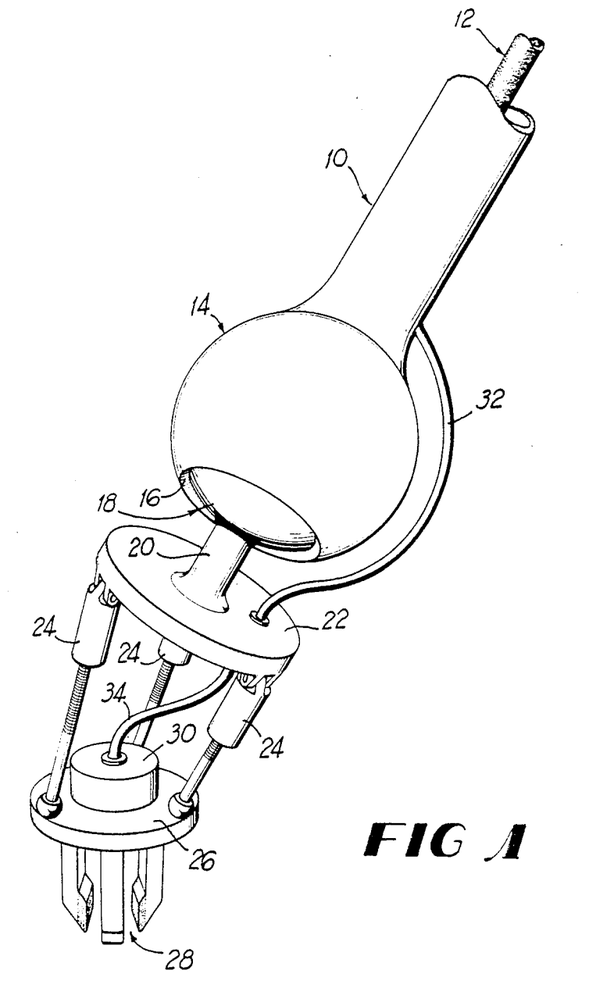
FIG. 1 is a diagrammatic perspective view of an embodiment of this invention.

With reference to FIG. 1 at this time, the robotic actuator illustrated therein includes a frame in the form of an arm 10 provided with an outer wrist joint member 14 at an end thereof. The member 10 is hollow and the power cable 12 passes therethrough for powering the entire assembly. The member 14 may be of any external shape but is defines a semispherical inner surface having a polar cap opening 16 and which defines a part-spherical socket which, with slight clearance, holds the spherical rotor means 18 captive therein so that the rotor means is rotatable in any direction within the socket. A motion transmitting member 20 is fixed to the rotor means 18 and projects therefrom through the opening 16 into connection with the member 22 which mounts a plurality of linear or in-parallel actuators 24. The actuators 24 may be gimballed to the member 22 and to the further member 26 which mounts the actuator 30 and the articulated gripper fingers 28 for movement relative to the member 26 as controlled by the actuator 30. It is to be understood that the details of the linear actuators 24 and of the actuator 30 and the grippers 28 form no part of this invention, the details of the wrist joint assembly being that to which this invention is directed.

The power cable contains conductors for powering the wrist joint assembly and has a breakout 32 which powers the actuators 24 and a further breakout 34 from the first breakout 32 which powers the actuator 30.

Figure 2:
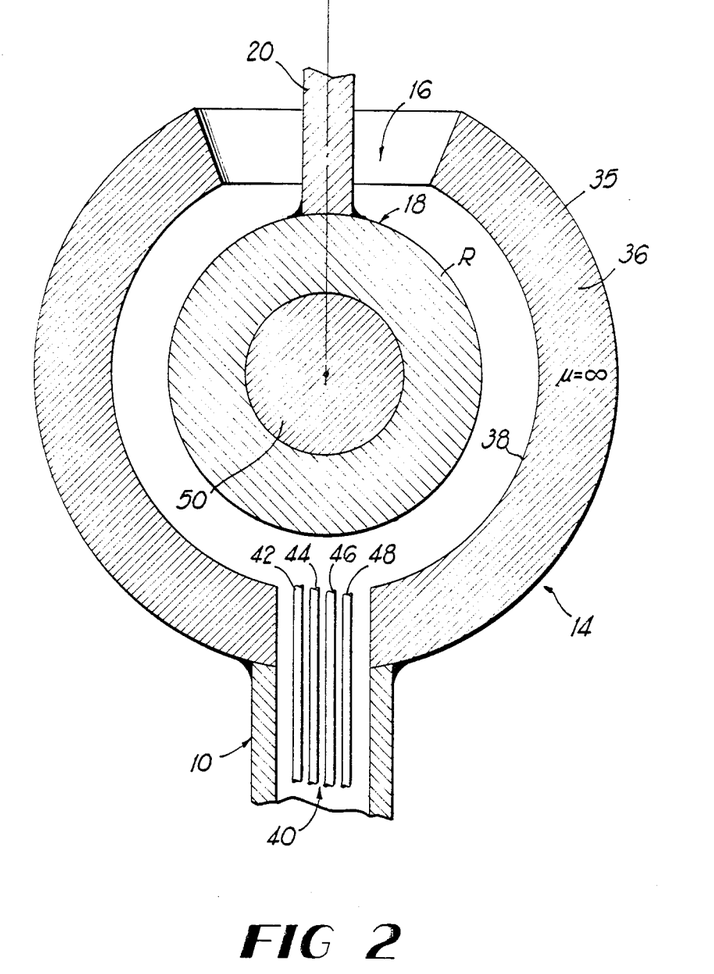
FIG. 2 is a diagrammatic cross section taken through the stator and rotor of an inductive type drive.

FIG. 2 illustrates, somewhat diagrammatically in order to indicate the structure with greater clarity, a cross section through the stator/rotor combination of the preferred embodiment of the invention, the induction type drive. As illustrated, the stator 35 comprises an outer sheath 36 of iron which presents the semispherical inner surface 38 defining the socket of the wrist joint, and within which the rotor means is held rotatively captive for relative rotation within the socket in any direction. The opening 16 is of polar cap form and, diametrically opposite thereto is a further opening 40 to allow the conductors 42, 44, 46 and 48 to pass from the power cable 12. As will be evident hereinafter, one pair of the conductors is for the lattitudinally wound turns of one winding and the other pair of conductors is for the longitudinally wound turns of the other winding. These two windings allow generation of angular momentum about two orthogonal axes. A third similar winding, omitted from the drawings for clarity, transverse to the other two windings allows for angular momentum generation about the third axis. The outer sheath 36 is made of infinite mu iron and although not illustrated in FIG. 2, its spherical inner surface 38 is formed by a thin, conductive shell which supports the winding turns as hereinafter described. The air gap between the rotor means and the inner surface 38 is deliberately distorted in dimension in FIG. 2 so that both the rotor means and the stator may be seen clearly. The rotor means comprises an outer conducting hollow spherical shell R filled with ferromagnetic material 50.

Figure 3:
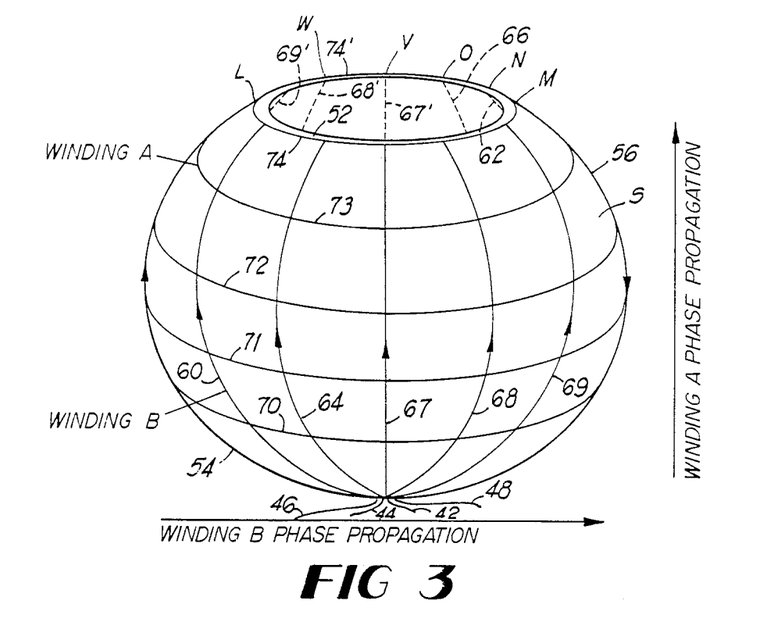
FIG. 3 is a perspective view of the inductive drive stator illustrating the winding means.

FIG. 3 illustrates the stator winding means. There are two windings A and B whose turns are wound in the directions indicated by the arrows on the noted thin, hollow shell S having the opening 16 therein whose edge 52 forms a path along which the winding extend as will now be described. One conductor for the windings has two ends 42 and 44 whereas the other conductor for the other winding has two ends 46 and 48. The end 42 leads to the beginning of the winding 54 which extends longitudinally up to the edge 52 at point L, then along this edge to the point M where it passes back down the opposite side of the shell as indicated at 56 until it reaches the bottom. Then, the next turn 60 begins until it reaches the edge 52 where it then passes along the edge to the point N where it passes along the back side of the shell as indicated at 62 back to the bottom where the next turn 64 beings. The turn 64 passes up to the edge 52 and then along it to the point O where it passes along the back side as indicated at 66 back to the bottom. This pattern continues for the turns 67, 68 and 69 and their corresponding back side return 67', 68' and 69'. The opposite side return path 69' leads to the other end 44 of the conductor forming the pair of ends 24 and 44. Points V and W correspond to points on the edge 52 at which the back side turn halves 67' and 68' begin. This completes the longitudinally extending winding B. In a similar fashion, the latitudinally extending winding A is formed. The end 46 of the other conductor forming the pair of ends 46 and 48 leads to the beginning of the lowermost turn 70, along the back side of the shell to the beginning of the next turn 71. In leading to the first turn 70, the end 46 may pass side-by-side with a portion P of the turn 54 to the point Q and then begin the turn 70. At the end of the turn 70 along the back side of the shell, the winding may continue to the next turn 71 side-by-side with the turn 54 from the point Q to the point U, and so on for successive turns 72, 73 and 74. The noted other conductor extends from the back side of the shell upon completion of the back side 74' of the last turn 74 at the point L, along the edge 52 to the point m and then side-by-side with the longitudinally extending turn 56 it to lead into the end 48. It will be appreciated that the four ends of the two conductors are illustrated spread apart in the figure for clarity.

If the two windings are excited with equal excitation and phase, the net field propogation is as indicated in FIG. 3. Obviously the direction of the net field propogation can be controlled by varying the relative amplitudes and/or relative phase of the excitations. Such control is not illustrated in detail since the expedients for so doing should be obvious to those of ordinary skill in the art. In this way, the rotor means may be controlled to rotate in any direction within the socket defined by the stator. Thus, control of the rotor means about the roll axis is about that axis from which the motion transmitting member radially extends from the rotor means in FIG. 1, the pitch axis being orthogonal thereto and the yaw axis being orhogonal to both. These axes intersect at the center of the rotor means.

Figure 4:
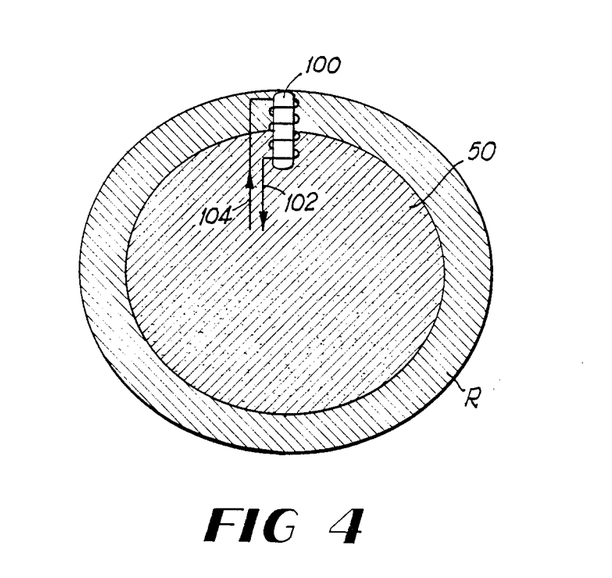
FIG. 4 is a cross section taken through the inductive type drive rotor illustrating the pickup coil means associated therewith.

For the inductive type drive, the rotor means is provided with the pickup coil 100 as illustrated in FIG. 4. The winding for this coil is provided by a conductor whose ends 102 and 104 are connected to sensing means 106 as illustrated in FIG. 6 hereinafter described.

Figure 5:
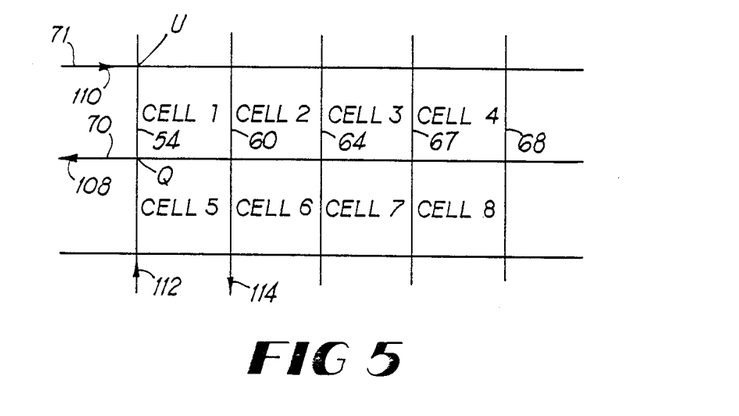
FIG. 5 is a diagrammatic view illustrating excitation of the individual cells defined by adjacent half turns of the winding means.

The principal will be evident from FIG. 5 where the front side half turns 70 and 71 of the winding A are illustrated and the front side half turns 54 and 60 of the winding B are illustrated. To excite the cell 1, the ends of the front side half turns 70 and 71 (i.e., at the points Q and U) are connected with an exciting source which excites these two half turns in the directions of the arrows 108 and 110 at a high frequency, preferably in the order of 100 kHz, but in any event, much higher than the frequency (60 Hz) at which the windings are excited for rotation control of the rotor means. At the same time, the front side half turns 54 and 60 are also excited at this high frequency in the directions of the arrows 112 and 114 by connecting conductors at the bottom ends of the front side half turns 54 and 60 to the high frequency source.

Figure 6:
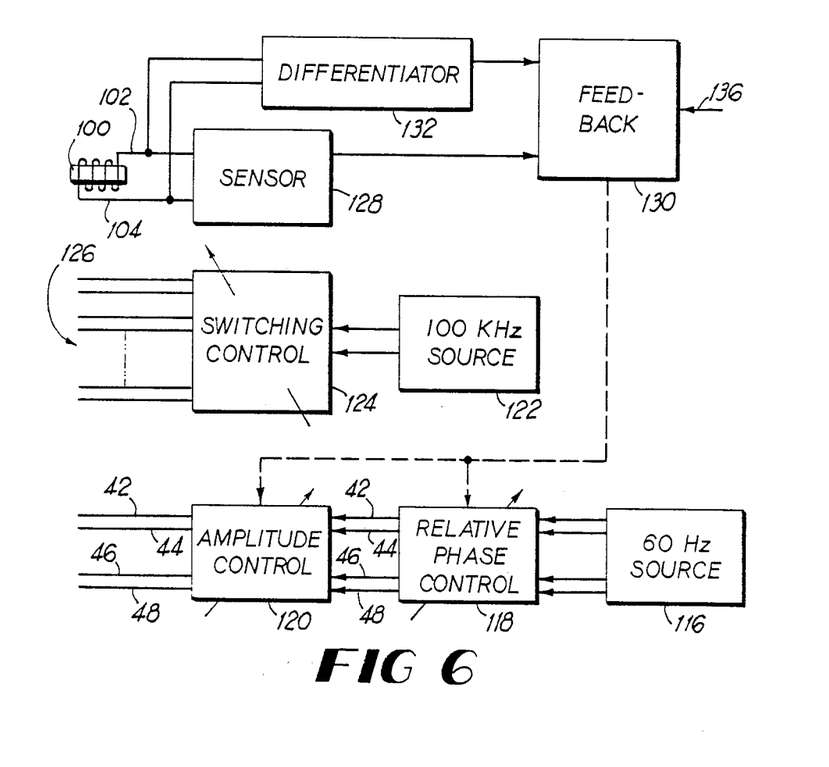
FIG. 6 is a block diagram of the control system.

FIG. 6 illustrates the block diagram of the various control components for the inductive drive type with pickup coil means. As shown, a 60 Hz polyphase source 116 is connected through the variable phase control mechanism 118 whose output adjusts the relative phase between the conductor pair 42, 44 and the conductor pair 46, 48, and then through the variable amplitude mechanism 120 whose output adjusts the relative amplitudes at which the pair 42, 44 and the pair 44, 46 are excited. The 100 kHz source 122 is applied to the switching control mechanism 124 which selects which of the conductor pairs 126 is to be excited at the 100 kHz frequency. It will be understood that each pair emanating from the mechanism 124 is connected to the two windings to excite the individual cells as is illustrated and described in connection with FIG. 5. The pickup coil 11 is located on the rotor means in such position that it may be opposite any cell no matter what the relative position of the rotor means with respect to the stator. Obviously, then, the pickup coil 100 is most advantageously located along a diameter of the rotor means which is at right angles to the roll axis, and may be located along either the pitch or yaw axes, for example. The signal sensed on the conductors 102, 104 when the coil 100 is opposite a particular cell being excited thus positively identifies the relative rotational position of the rotor means with respect to the stator. This signal is sensed at 128 and differentiated at 132 and the outputs are applied to the feedback mechanism 130. The rate of rotation of the rotor means is signaled at the output of the differentiating mechanism 132 and the position of the rotor means with respect to the stator is signaled at the output of the sensor 128. The feedback signal at 134 is used automatically adjust the control mechanisms 118 and 120 and thereby control the rate of rotation and the relative degree thereof and, as well, what rotational position is to be held or maintained if so desired. In this respect, control of the feedback mechanism may be effected by external input at 136 to achieve the desired result. Generally speaking, only limited rotation about the pitch and yaw axes can be tolerated to avoid striking of the motion transmitting member 20 against the stator at the boundary of the opening 16. Unlimited rotation about the roll axis, however, can be permitted because the member 20 extends radially from the rotor means along this axis or close thereto. Of course, the member 20 need not be aligned along any of the three axes but, in general it must be aligned along an axis of the rotor means which is at right angles or substantially at right angles to the axis along which the coil 100 is aligned.

Figure 7:
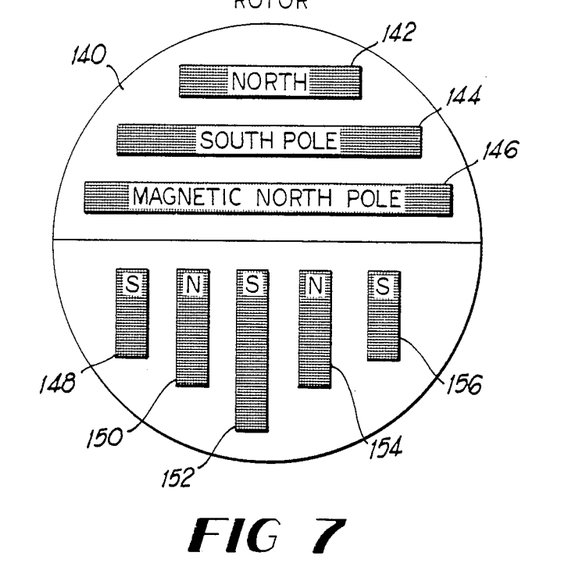
FIG. 7 is an illustration of the rotor means of the synchronous type drive.

FIG. 7 illustrates the manner in which the rotor means may be made for synchronous type drive operation. The main body 140 of the rotor is spherical and made of magnetizable material, such as steel. One hemisphere is provided with permanent magnets 142, 144 and 146 of elongate, strip-like form inlaid into this hemisphere and poled as illustrated. Whereas, the lower hemisphere illustrated is inlaid with strip-like permanent magnets 148, 150, 152, 154 and 156 poled as shown. The opposite sides of each hemisphere are inlaid in identical manner to that shown. In this type drive domain, the rotor is not unlike the standard electric power generator drives in principal. The magnets must be arranged transverse to each other in the two hemispheres to realize all possible degrees of motion. As in the reluctance type drive described below, the synchronous type drive incurs very low losses in low speed operation and although more powerful than such reluctance type drive, it is considerably more expensive to construct the rotor. The system is robust, however, and has a built in feedback system to sense rotor position, i.e., the active rotor field due to the magnetomotive force being placed directly on the rotor.

Figure 8:
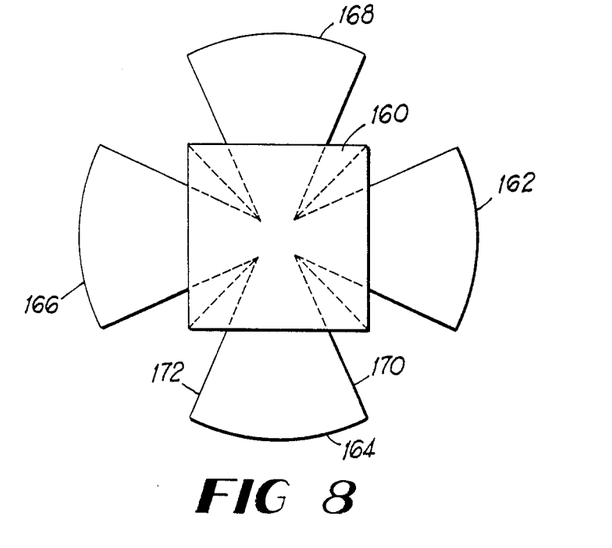
FIG. 8 is an illustration of the rotor means of the reluctance type drive.

FIG. 8 illustrates the manner in which the rotor means of a reluctance type drive may be formed. Again, the rotor is of spherical form but is anisotropically shaped as a six-armed cross. The surfaces 160, 162, 164, 166 and 168 of the five arms seen in FIG. 8 are of rectangular plan view but are spherical as illustrated. Each arm diverges from a common center along all four sides thereof as indicated at 170 and 172, for example. The rotor is made of magnetizable steel and to capitalize on magnetization forces, it is made anisotropically, for example in the six-armed cross configuration as shown. This particular type of drive resembles a stepper motor drive and its key feature is precision of control movements. A secondary feature is that losses are considerably reduced over low speed inductive type drive. The stator windings may be excited to selectively pull the arms into specified positions.

In each of the constructions noted above, the stator winding means may be of the same basic construction.

We claim:

1. A spherical motor particularly adapted for robotic control, comprising a stator housing defining a semispherical socket having an opening of generally polar cap form, spherical rotor means rotatably received in said socket for rotation therein about three axes intersecting at the center of said rotor means, one of said axes projecting through said opening and the other two axes being orthogonal thereto, motion transmitting means carried by said rotor means and aligned generally along said one axis to project through said opening, winding means carried by said stator housing in encompassing and opposed relation to said rotor means for rotating said rotor means about said axes, and polyphase control means for selectively controlling relative phase and energization of said winding means to rotate said spherical rotor means a substantially unlimited amount about said one axis and in limited amounts about said other axes so as to maintain said motion transmitting member within the confines of said opening.

2. A spherical motor as defined in claim 1 wherein said winding means comprises a pair of separate windings disposed in crossing relation to each other.

3. A spherical motor as defined in claim 2 including means for determining the rotational position of said rotor means within said socket.

4. A spherical motor as defined in claim 2 wherein said rotor means is of the reluctance drive type.

5. A spherical motor as defined in claim 2 wherein said rotor means is of the inductive drive type.

6. A spherical motor as defined in claim 2 wherein said rotor means is of the synchronous drive type.

7. A spherical motor as defined in claim 6 wherein said rotor means is in the form of a spherical conducting shell containing ferromagnetic material.

8. A spherical motor as defined in claim 5 wherein said rotor means is in the form of a spherical conducting shell containing ferromagnetic material.

9. A spherical motor as defined in claim 4 wherein said rotor means is formed of magnetizable material having arms projecting along said axes.

10. A spherical motor as defined in claim 2 including means for energizing adjacent crossed pairs of the winding means sequentially for repetitiously creating flux concentrations within the areas defined within such cross pairs.

11. A spherical motor as defined in claim 10 including pickup coil means carried by said rotor means for sensing when one of said areas is opposite thereto.

12. A spherical motor particularly adapted for use in robotics, which comprises a stator housing defining a generally spherical socket having an opening defining a generally polar cap portion thereof, rotor means rotatably captive within said socket for rotation in any direction therewith, motion transmitting means secured to said rotor means and projecting therefrom through said opening, winding means carried by said stator housing in generally surrounding relation to said rotor means for rotating said rotor means, and polyphase control means connected to said winding means for controlling the direction of rotation of said rotor means.

13. A spherical motor as defined in claim 12 wherein said winding means comprises a pair of separate windings disposed in crossing relation to each other.

14. A spherical motor as defined in claim 13 including means for determining the rotational position of said rotor means within said socket.

15. A spherical motor as defined in claim 13 wherein said rotor means is of the reluctance drive type.

16. A spherical motor as defined in claim 13 wherein said rotor means is of the inductive drive type.

17. A spherical motor as defined in claim 13 wherein said rotor means is of the synchronous drive type.

18. A spherical motor as defined in claim 17 wherein said rotor means is in the form of a spherical conducting shell containing ferromagnetic material.

19. A spherical motor as defined in claim 16 wherein said rotor means is in the form of a spherical conducting shell containing ferromagnetic material.

20. A spherical motor as defined in claim 15 wherein said rotor means is formed of magnetizable material having arms projecting along said axis.

21. A spherical motor as defined in claim 13 including means for energizing adjacent crossed pairs of the winding means sequentially for repetitiously creating flux concentrations within the areas defined within such crossed pairs.

22. A spherical motor as defined in claim 21 including pickup coil means carried by said rotor means for sensing when one of said areas is opposite thereto.

23. A robotic wrist joint assembly comprising the combination of a stator housing having a generally spherical inner surface defining a socket, the socket having diametrically opposed polar openings, first winding means comprising a conductor leading to the edge of one polar opening, latitudinally with respect to said inner surface to the edge of the other polar opening to define substantially one half of a winding turn, along the edge of the other polar opening and then latitudinally with respect to said inner surface back to the one polar opening to define the other half of such winding turn in diametrically opposed relation to the first half thereof, and repetitiously therafter to define the remainder of the windings turns of the first winding means, second winding means comprising a second conductor leading to the edge of said one polar opening, longitudinally with respect to said inner surface to define a plurality of turns of the second winding means and then back to and leading away from the edge of the one polar opening, a generally spherical rotor means captive within said socket for rotation in any direction therewithin, and control means connected to said conductors for selectively controlling energization thereof correspondingly to control the directions of rotation of the rotor means within the socket.

24. A robotic wrist joint comprising the combination of a frame having an outer wrist joint member provided with a generally spherical inner surface defining a wrist joint socket, a spherical rotor received in said wrist joint member and rotatable therein in any direction, polyphase winding means carried by said outer wrist joint member for rotating said rotor, and motion transmitting means fixed to said rotor for transmitting motion imparted to said rotor externally of the robotic wrist joint.

25. A spherical induction motor comprising the combination of:
 a conductive spherical rotor and a spherical stator surrounding said rotor; a first set of winding turns on said stator having individual turns thereof disposed in spaced relation to each other and a second set of winding turns on said stator having individual turns thereof disposed in spaced relation to each other and substantially orthogonally crossing the turns of the first set of windings so that each adjacent pair of turns of said first set of windings and each adjacent pair of turns of the second set of windings bound a space defining a cell therewithin;

means for variably energizing said first and second sets of windings at a predetermined frequency so as to induce a net rotative torque upon said rotor; and means for exciting individual pairs of turns of first set of windings and individual adjacent pairs of turns of said second set of windings at a second predetermined frequency so as repetitiously to scan through all of said cells.

26. A spherical induction motor as defined in claim 25 including means on said rotor for determining the rotational position of said rotor with respect to said stator in response to the repetitious scanning of the cells.

* * * * *